(12) United States Patent
Agrawal et al.

(10) Patent No.: US 8,749,869 B2
(45) Date of Patent: Jun. 10, 2014

(54) METAL COATINGS, CONDUCTIVE NANOPARTICLES AND APPLICATIONS OF THE SAME

(75) Inventors: Anoop Agrawal, Tucson, AZ (US); John P. Cronin, Tuscon, AZ (US)

(73) Assignee: AJJER, LLC, Tucson, AZ (US)

( * ) Notice: Subject to any disclaimer, the term of this patent is extended or adjusted under 35 U.S.C. 154(b) by 0 days.

(21) Appl. No.: 13/372,384

(22) Filed: Feb. 13, 2012

(65) Prior Publication Data

US 2012/0141779 A1    Jun. 7, 2012

Related U.S. Application Data

(62) Division of application No. 12/497,535, filed on Jul. 2, 2009, now Pat. No. 8,130,438.

(60) Provisional application No. 61/078,328, filed on Jul. 3, 2008.

(51) Int. Cl.
*G02F 1/153* (2006.01)
*G09G 3/38* (2006.01)

(52) U.S. Cl.
USPC .......................................... 359/275; 345/105

(58) Field of Classification Search
USPC ......... 359/259, 315–316, 237, 263, 252–254, 359/318, 265–275, 277, 245–250, 242; 249/24, 113; 345/49, 105; 250/70; 438/929

See application file for complete search history.

(56) References Cited

U.S. PATENT DOCUMENTS

| | | | |
|---|---|---|---|
| 2004/0105980 A1* | 6/2004 | Sudarshan et al. | 428/404 |
| 2006/0003152 A1* | 1/2006 | Youngs | 428/212 |
| 2008/0264682 A1* | 10/2008 | Catron et al. | 174/257 |
| 2009/0176112 A1* | 7/2009 | Kruckenberg et al. | 428/457 |

* cited by examiner

*Primary Examiner* — Dawayne A Pinkney (57) ABSTRACT

This invention discloses corrosion resistant metal compositions that may be used to form nanoparticles or for coating of particles. Further, such particles may be used to fabricate printable transparent conductors that may be used in electronic devices. Electrochromic displays formed using such conductors are described.

11 Claims, 5 Drawing Sheets

METAL COATINGS, CONDUCTIVE NANOPARTICLES AND APPLICATIONS OF THE SAME

RELATED APPLICATIONS

Claim of Priority

This Application is related to and claims priority from provisional Application Ser. No. 61/078,328, filed Jul. 3, 2008, and is a divisional of the U.S. application Ser. No. 12/497,535 filed on Jul. 2, 2009, which applications are incorporated by reference herein.

FIELD OF THE INVENTION

The present invention relates to forming metal coated conductive particles and metal nanoparticles that are corrosion resistant, and applications of such particles.

BACKGROUND OF THE INVENTION

Processes are required to make metal coated particles, and further able to extend these to coating of nanoparticles such as fibers, disks and other shapes. Further, preferred compositions are those that possess corrosion resistance properties. Potential commercial applications include novel low temperature processable transparent conductors, printable connectors, shielding and antistatic applications. This invention allows one to coat particles of various shapes and sizes, including those with disk-like geometry. Preferred shapes for coating are disks and fibers that are nanosized. Coated particles can be used to formulate inks that can be printed to yield conductive paths and coatings for electronic applications and devices. Applications for silver nanocrystals and flakes also include catalysis and biological applications such as anti-microbial, anti-bacterial, anti-viral, antibiotic and anti-fungal agent, when incorporated in coatings, first aid bandages, plastics, soap, textiles and in self cleaning fabrics, and as conductive filler. For many applications it is preferred that these coatings or these nanoparticles to be resistant to corrosion. The methods used here may also be used to make corrosion resistant compositions by using a mixture of several elements.

The metal coated nanoparticles or metal nanoparticles with corrosion resistance can be used to form electrical connectors and/or transparent conductors. Further these conductors and connectors may be printed. This allows electronic circuits and devices to be formed on a variety of substrates at a low cost.

SUMMARY OF THE PRESENT INVENTION

In accordance with the purposes of the present invention, as embodied and broadly described herein, the present invention provides materials and methods of forming cost-effective coatings of metals on substrates, particularly non-conductive substrates. These methods can be advantageously used to coat nanoparticles with corrosion resistant metal compositions, and also form corrosion resistant nanoparticles. These may be further formulated in compositions and inks that can be used by a variety of printing processes to create electrically functional devices.

DETAILED DESCRIPTION

Nanowires of metals and carbon have been suggested for use in inks to deposit conductive traces or coatings by printing. Nanosized fibers (or nanowires) are those that have an average diameter (or cross-sectional dimension for cross-section shapes that are not round) of less than 100 nm with an aspect ratio (length to diameter) greater than about 5, and for nanodisks, the thickness is less than 100 nm and with aspect ratio (i.e. both the width or length ratio to that of thickness) to be greater than 5. This invention is targeted at forming nanoparticles of metals, and also producing metal coated nanoparticles. The coated particles can be of any shape, but as discussed below, the preferred shapes to be coated are those that are fiber or disk shaped. Such shapes may be solid or hollow. Although these coatings can be deposited on conductive particles, the most benefit can be derived by coating them on non-conductive or semiconductive or low conductivity particles. Some of the preferred substrate materials without limitation are polymers, ceramics, carbon, inorganic oxide glasses and crystalline materials. Further, use of polymeric fibers as substrates allows one to obtain flexible conductive particles. Another preferred nanosized substrate are exfoliated inorganic clays. These clays are described in detail below as they offer an opportunity to form low-cost conductive disk shaped particles.

Transparent conductors as coatings are used in many applications, particularly sensors, display devices, light emitting and light control devices. For many of these devices it is desirable to process coatings using low cost technologies such as printing or coating from liquid medium. One of the challenges in these devices is the deposition of transparent conductor (TC) layers. Conventional TCs such as indium tin oxide, fluorine doped tin oxide, aluminum doped zinc oxide are usually deposited by physical vapor deposition or chemical vapor deposition. For some types of devices and applications it is economically desirable that all layers including TCs be deposited using printing processes. For most applications the transmission of the printed TCs should be as high as possible. For solution deposited or printed TCs transparency should be in the wavelength range of 400 to 700 nm. Many times, the transparency of these conductors is characterized in photopic range or at 550 nm which is for maximum eye sensitivity in the daytime. For applications involving colors, transparency in a broad range of 400 to 700 nm is preferred. These transparent conductors can be evaluated by depositing on a transparent substrate, e.g., glass, acrylic, polyester, polycarbonate, etc. A transmission in excess of 30% is acceptable for some applications. A transmission in excess of 80% at the desired wavelength on a substrate is most desirable. Typical substrate thickness to measure transparency is about 0.05 to 3 mm. In terms of surface resistivity these values are also dependent on the application. Coatings where the surface resistivity can be tailored to less than about 1000 ohms/square, are preferred. A substrate with a high performing transparent conductor deposited by solution or a printing process will have a transparency greater than 80% and a surface resistivity lower than 100 ohms/square. If a colored or a hazy substrate is used, that will naturally lower the transmission, however, to evaluate the relative merit of a transparent conductor, the substrate should be clear and the most preferred transmittance is greater than 80% at 550 nm with a colorless appearance, and with a resistivity of lower than about 300 ohms/square.

Conductive nanowires made out of ITO (Limmer, S. J., et al., Applied Physics A: Materials Science and Processing 79 (3), pp. 421-424 (2004) and carbon nanotubes (Trottier, C. M., Journal of the Society for Information Display 13 (9), pp. 759-763 (2005)) have also been suggested for transparent conductors. These may be useful for some applications including some of those which are contemplated here, however, it is preferred, that higher conductivity materials (such as metals) may be more universally suitable to develop transparent conductors in a wide range of conductivity, if one can address their corrosion resistance.

Conductive nanofibers made out of silver have been suggested for use as transparent conductors and electrical connectors (for example see published US patent application 2007/0074316 by Alden et al). The contents of this patent application are included herein by reference. These nanowires are prepared by polymer assisted reduction of silver nitrate at elevated temperatures in ethylene glycol. These nanowires have average diameters less than 100 nm and their lengths are typically 10 to 100 times greater. These nanowires are collected and redispersed in a liquid medium which is then used as ink or a coating solution to print or coat patterns of these on a given substrate. The liquid medium in addition to the volatile solvents may also have surfactants, corrosion inhibitors, polymers or monomers along with appropriate reactants and/or polymerization initiators that may form the matrix. As discussed later that in some cases no matrix is used. The corrosion inhibitors suggested in this patent application are those that can be added to the formulation so that these can coat the nanofibers. Examples given are aromatic triazoles, imidazoles and thiazoles, cysteine, and synthetic peptides and protein scaffolds with affinity towards the metals, dithiothiadiazole, alkyl dithiothiadiazoles and alkylthiols, antitarnish varnishes. Coating with gold, and alloying with other elements have also been suggested to reduce corrosion. In the present invention in addition to all of the above described corrosion prevention methods, one can also use specific elements to alloy with silver so as to increase the corrosion resistance. Such compositions will be described. Processes to deposit coatings of corrosion resistant metals on silver and copper nanowires will also be described.

The nanoparticles are dispersed in liquids to form inks that can be coated or printed for transparent conductors or conductive paths particularly in printed electronics. As an example nanoparticles have been used to formulate inks for printing. Some examples on such formulations and their use is given by Kim, D. et al, (Electrochemical and Solid-State Letters 8 (11), p-J30-J33 (2005)) and by Gamerith, S., et al, (Advanced Functional Materials 17 (16), p 3111 to 3118 (2007)).

The polymers that are used as a matrix for transparent conductors are usually optically clear. For printed connectors, the same matrix materials may be used or they may be opaque. However, the finished formulation for connectors is usually not transparent, as they have conductive particles including carbon blacks. Examples of suitable polymeric matrices include, but are not limited to: acrylics such as polymethacrylates (e.g., poly(methyl methacrylate)), acrylates and polyacrylonitriles, polyvinyl alcohols, polyvinyl acetate, polyesters (e.g., polyethylene terephthalate (PET), polyester naphthalate, and polycarbonates), polymers with a high degree of aromaticity such as phenolics or cresol-formaldehyde (novolacs), polystyrenes, polyvinyltoluene, polyvinylxylene, polyimides, polyamides, polyamideimides, polyetheramides, polysulfides, polysulfones, polyphenylenes, and polyphenyl ethers, polyurethane (PU), epoxy, polyolefins (e.g. polypropylene, polymethylpentene, and cyclic olefins), acrylonitrile-butadiene-styrene copolymer (ABS), cellulosics (e.g. cellulose acetate, methyl cellulose), silicones and other silicon-containing polymers (e.g. polysilsesquioxanes and polysilanes), polyvinylchloride (PVC), polyacetates, polynorbornenes, synthetic rubbers (e.g. EPR, SBR, EPDM), and fluoropolymers (e.g., polyvinylidene fluoride, polytetrafluoroethylene (TFE) or polyhexafluoropropylene and their copolymers e.g., Solef™ and Hylar™ from Solvay Solexis (Thorofare, N.J.), and Kynar™ from Arkema (King of Prussia, Pa.)); copolymers of fluoro-olefin and hydrocarbon olefin (e.g., Lumiflon™), and amorphous fluorocarbon polymers or copolymers (e.g., CYTOP™. by Asahi Glass Co., or Teflon™.AF by Du Pont (Wilmington, Del.)). Biodegradable polymers such as polyalkylene ester, polylactic acid and its copolymers, polyamide esters, polyvinyl esters and polyanhydrides may also be used. The list is also suggestive of including monomers that result in formation of any of the above polymers during processing. Some of these polymers are solidified after deposition by extraction of solvents and/or further polymerization. Some of the sources of monomers, catalysts and initiators for thermal and radiation (including UV) polymerization for acrylates and epoxies are Polysciences Inc (Warrington, Pa.), Sartomer (Exton, Pa.), UCB Radcure (Smyrna, Ga.) and Resolution Products (Houston, Tex.). To increase long term corrosion resistance it is better to use hydrophobic polymers as matrix materials from the above list such as fluorinated polymers, polyolefins and others. One may also use matrices formed by sol-gel precursors where inorganic or organic/inorganic hybrid networks are formed. Some of the common sol-gel precursors are tetraethylorthosilicate for silica, polyethylene glycol for adding a flexible organic if needed, and titanium isopropoxide for titania. Conductive polymers may also be used in part or as a matrix. These polymers may be colored, but their concentration and thickness of the film can be controlled to get adequate transparency. Some of these are poly(3,4-ethylenedioxythiophene) (PEDOT, e.g. Clevios™ available from HC Starck (Newton, Mass.)), polyanilines, polythiophenes, polypyrrole, and polydiacetylenes. Optionally, additives may be added to the conventional polymers above to promote biodegradation as long as they do not interact adversely with the functional characteristics of the device. This is an important issue as many printed electronic devices will be used in packaging nd labeling and will end up in a landfill in large numbers. For example an additive called Bio-Batch™ is available from Biotec Environmental LLC in Albuquerque, N. Mex.

The methods described by Alden, et. al., (US patent application 2007/0074316) to deposit the transparent conductors formed by metal nanowires and their patterning, are also all applicable here which include printing and other wet chemical processes. Details of deposition processes are given in this published patent application which are all incorporated by reference herein. A few details from this application will be repeated here. In one method, the nanowires are dispersed in a non-corrosive liquid with a boiling point of less than 200 C (e.g., water, ketones, xylenes, toluene, alcohol and mixed solvents) along with surfactant and a polymeric binder selected from the above. One may also lay down the nanowires from a solution that does not comprise of any binder or matrix. The web of fibers laid down on the surface are pressed into the surface of the substrate layer or a predeposited layer(s) that may be a part of a device. To provide good contact and binding, this layer may be pressed onto these layers or substrate. This pressure may be accompanied by heat. A layer of encapsulating polymeric layer (same materials as those listed above for matrices) may be deposited after the conductive layer deposition as long as it does not adversely react or solubilize the underlying layers. Patterning of these layers may also be done in a fashion as described in the above patent application by Alden et al, where photopolymers are used in the matrix. The photopolymers are polymerized through a mask after the deposition process, and the non-polymerized areas are then washed off. Alternatively, the conductive layer could simply be deposited in the desired pattern by a printing process.

An important focus of this invention is printability of the materials as coatings or conductive paths. The inks to deposit such coatings or conductive traces may comprise of nanoparticles or nanofibers of high conductivity corrosion resistant metal alloys. It must be understood that more additives will be required to form a complete ink formulation depending on the print process used. This includes agents to control viscosity (including thixotropy), surface tension, drying control, antifoaming agents and others. Any printing methods may be used that are suitable for the product and conforms to the layer thickness requirements. For those layers where a high deposition uniformity is required in a pattern with width generally lower than 100 microns, one of the preferred methods of print deposition is by Maskless Mesoscale Materials Deposition by Optomec (Albuquerque, N. Mex.). This printing/spray method may be used to deposit conducting traces or layers in a device.

Silver-alloy compositions that are corrosion resistant can be found in several US patents, where these were developed for use in the optical disk (data storage) industry as semireflecting optical layer. Many of these compositions have not been suggested or used as compositions for nanoparticles or coated particles that may be used for electronic applications and devices. Some of the representative patents from the optical data storage industry are U.S. Pat. Nos. 7,316,837; 7,314,660; 7,314,659; 7,314,657; 7,291,374; 7,018,696; 6,905,750; 6,896,947; 6,790,503; 6,764,735; 6,544,616; 6,451,402; 6,280,811; 6,007,889; 6,689,444 and 7,033,730. U.S. Pat. No. 5,818,625 also uses similar compositions for a reflective and a conductive layer in automotive EC mirrors. These silver compositions may also comprise several metal combinations but usually comprise of at least one or more selected from beryllium, noble elements (i.e. Ru, Rh, Au, Pt and Pd) and rare earth elements (La, Ce, Nd, Sm, Eu). Some of the other metals are Cu, Mn, Mg, Zn and Ti. Some of the preferred rare earth elements are samarium and neodymium. With samarium the other preferred alloying elements are copper, and then titanium and manganese may be added optionally. The above patents provide many compositions, and the compositions of corrosion resistant silver alloys from these patents are included herein by reference. As an example, a samarium comprising silver alloy composition may have 0.3 wt. % samarium (Sm), 0.7 wt. % copper (Cu), 0.2 wt. % titanium (Ti), and 0.5 wt. % manganese (Mn), the balance being silver (Ag). An alloy with neodymium can be made with 0.5 atomic % Nd and the balance being silver. Another corrosion resistant composition had 0.5% Nd-0.9% Cu-1.0% Au (all in atomic percentages). The compositions without the rare earths usually have beryllium, gold, rhodium, ruthenium, platinum and palladium added to the silver, with optionally adding other materials such as copper, titanium, zinc, manganese, magnesium and beryllium. As an example one composition had 8.9% Au, 3.8% Pd and another had 2.6% Au, 1.1% Pd, 0.3% Pt, 0.4% Cu (both of these compositions being in atomic %). For improved corrosion resistance copper or silver nanofibers may also be coated by Sn, Ru, Rh, Pt, Pd, La, Nd, Sm and Eu, and materials comprising the same. Copper alloys using these materials and silver also result in better corrosion resistance.

Nanofibers of metals may be made by following the generic procedures by Sun et al (Ref: Yugang Sun et al Nano Letters Vol. 2, No. 2 165-168, 2002) called soft solution processing (SSP). SSP is being increasingly used to generate novel nanoshaped particles. This process is also used by Alden et al in their published patent application. In one description of this process silver nanowires are produced by refluxing platinum chloride with ethylene glycol at 160° C. The ethylene glycol serves both as a solvent and a reducing agent for platinum. This results in forming platinum nuclei. To this mixture, silver nitrate and polyvinyl pyrrolidone (PVP) are added, silver nanoparticles are formed around these nuclei due to the reduction by ethylene glycol. With continued reaction nanorods are formed by growth of these particles. PVP is essential in generating the silver nanowires as this is able to absorb/deabsorb on specific crystal surfaces and promote growth only along favored orientations (Zhang, Z., Zhao, B., Hu, L., "*PVP protective mechanism of ultrafine silver powder synthesized by chemical reduction processes*", J. of Solid State Chemistry, Vol 121 (1996) p-105). The nanowires produced can have diameters in a range of about 40 nm and lengths of several microns. These may also be hollow. Another important variable in the formation of these nanowires is the reaction temperature, where lower or higher reaction temperatures inhibited the length of the nanowires. These methods are also used to make silver alloy nanowires (US patent application 20050056118). Some of these were alloys of silver with gold, platinum and palladium, however, none of these were used as transparent conductors or in printed corrosion resistant connections in electronic applications.

In another variation to make nanowires, the platinum seed crystals are not used (Korte, K. E., Skrabalak, S. E., Xia, Y., "*Rapid Synthesis of Silver Nanowires through a CuCl or CuCl$_2$ mediated polyol process*", Journal of Materials Chemistry, Vol 18 (2008), p-437). Silver nitrate in ethylene glycol was reduced in presence of oxygen scavengers and PVP. The oxygen scavengers (copper chloride) promoted the crystal growth of homogenously nucleated crystals in the [111] plane leading to long wires. It was also found that the growth rate of the nuclei could be substantially controlled by adding other salts. As an example, use of copper (II) nitrate or only NaCl resulted in curbing preferential growth that lead to nanowires, thus only forming 3-D shaped particles. When the materials are processed in argon atmosphere using copper chloride, the growth along the length was higher promoting thinner wires.

Reduction processes using glycols have been done for many other materials, e.g., Au, Bi, Cd, Co, In, Ir, Ni, Pd, Pt, Rh, Ru and Sn (Fievet, F., Lagier, J. P., Figlarz, M., "*Preparing monodisperse metal powders in micrometer and submicrometer sizes by the polyol process*", MRS Bulletin, vol 14 (12) (1989) p-29. Wang, Y., Xia, Y., "*Bottom up and top-down approaches to the synthesis of monodispersed spherical colloids of low melting point metals*", Nano Letters, vol 4 (2004)

p-2047. Bonet, F., Delmas, V., Grugeon, V., Urbina, S., Silvert, R. H., Tekaia-Elhsissen, K., "*Synthesis of monodisperse Au, Pt, Pd, Ru and Ir nanoparticles in ethylene glycol*", *Nanostructures and Materials*, vol 11 (1999) p-1277), and it is a matter of determining the conditions for each to get specific geometry and application.

Variations of this method have been used to make a variety of geometries, such as nanoplates, nanocubes and others. These geometries are controlled by kinetic processes such as controlling growth along specific crystalline planes, and natural etch rates along others. To make nanoplates, PVP is substituted by polyacrylamide (PAM) (Xiong, Y, Siekkinen, Wang, J., Yin, Y., Kim, M. J., Xia, Y., "*Synthesis of silver nanoplates at high yields by slowing down the polyol reduction of silver nitrate with polyacrylamide*", Journal of Materials Chemistry, vol 17 (2007) p-2600). The acrylamide group complexes with the salts such as silver nitrate, and hence is able to control the growth kinetics. This favors the growth of the nuclei in the circumferential direction, while capping the longitudinal growth. This process also reduces the yield of nanoparticles that are generated and is not too suitable to generate nanodiscs in high yield, but as discussed later, this process can be used effectively for coating deposition. Additional work has also been reported where three dimensional nanoparticles such as nanocubes are made. This demonstrates that a nucleus, once formed, could be made to grow in one or two or three dimensions.

The examples provided below are preferred procedures based on the literature outlining how the alloy nanowires may be formed. Although any procedure may be used such as those by gamma radiation of solutions (Lahiri, D., Et al, Physica Scripta T, Volume T115, p-776 (2205), or by bio synthesis (see Senapati, et al, Small Vol 1 (5), p-517 (2005), but those processes that are scalable and have high yield are most desirable. The examples below also include preparation of coated particles, and use of salt binding polymers.

Example 1

A silver-gold alloy nanowire can be prepared as follows: First a solution of platinum nanoparticles is prepared by reducing $PtCl_2$ ($10^{-5}$M) with ethylene glycol at 160° C. The ethylene glycol acts as a reducing agent for $PtCl_2$ and a solvent for the Pt nanoparticles that function as the seeds or the nuclei for the alloy nanowires to grow from. A second solution is prepared where $AgNO_3$ (4.33 $10^{-2}$M) is dissolved in 2.4 wt % poly(vinyl) pyrrolidone PVP, Mw~40,000, in ethylene glycol. A third solution is prepared where $AuCl_3$ (4.4 $10^{-3}$M) is dissolved in ethylene glycol. Using a three neck reaction vessel where the two side necks contain vessels with the Ag and Au solutions respectively and the main vessel contains the Pt seeds in ethylene glycol at 160° C. Since the reduction rates of the various metal salts are different, and in this case silver and the gold salts, one has to adjust their concentrations to get a desired alloy composition. The concentration of the salts in the solution does not transform into identical concentration of the alloy. The center neck is used for a condenser. Under reflux the Ag solution is slowly added to the Pt seed solution. When about 20% of the solution is added the Au solution is then also slowly added to the mixture. Maximum temperature is 160° C. and reaction times can vary from 30 to 120 minutes. The wires are separated from the solution using centrifugation.

Example 2

To alter the physical, mechanical and chemical properties of the nanowires the following samples can be prepared. The reaction described in example 1 is repeated to form different alloys of silver where the alloying metal at 20 wt % (total maximum concentration of all alloying elements in silver) is initially added as the chloride in ethylene glycol and reduced to form the nanowires. Starting chlorides include $CuCl_2$, $AuCl_3$, $NiCl_2$, and $GeCl_2$. Addition of Cu, Au and Ge improve the hardness of the nanowires while Pd and Ni improve chemical resistance to oxidation and improve resistance to corrosion. Depending on the rate of addition of metals, the order of addition, concentration of the surfactant PVP, the reaction temperature and the time at temperature nanowire alloys of Ag and the alloying metal are formed.

Example 3

The reaction described in example 1 can be repeated to form different alloys of silver where the alloying metal at 20 wt % is initially added as the nitrate in ethylene glycol and reduced to form the nanowires. Starting nitrates include $Cu(NO_3)_2.6H_2O$ $Pd(NO_3)_2.$, $AuNO_3$, $Ni(NO_3)_2.6H_2O$. For addition of germanium as the chloride is preferred. Addition of Cu, Au and Ge improve the hardness of the nanowires while Pd and Ni improve chemical resistance to oxidation, sulifidation and improve resistance to corrosion. Depending on the rate of addition of metals, the order of addition, concentration of the surfactant PVP, the reaction temperature and the time at temperature nanowire alloys of Ag and the alloying metal are formed.

Example 4

Alloys composed of more than one metal can be formed by following the procedure as described in example 1 where the third solution is composed of a mixture of metal chlorides or nitrates or combinations of both. For example an alloy of silver with Cu and Pd could be formed where the copper adduct is the chloride and the palladium is the nitrate.

Example 5

Alloys composed of more than one metal can be formed by following the procedure as described in example 1 where the third solution is composed of a mixture of metal chlorides or nitrates or combinations of both. For example an alloy of silver with Cu and Pd could be formed where the copper adduct is the chloride and the palladium is the nitrate.

Example 6

The nanowires of silver alloys when isolated can be re-dispersed in an organic/inorganic medium such as sol-gel solutions or a monomer/polymer medium or a solution of a conductive polymer to form a coating solution. Preferred solution concentrations are in the range between 0.2 and 5 volume %. The minimum concentration for percolation is dependent on the aspect ratio and the nanowire diameter. Upon deposition of the solution by dip, spray, spin or printing a thin transparent film, opaque or non transparent electronic conductor is formed.

Example 7

A silver nanowire can be prepared as follows according to Yugang Sun et al: first a solution of platinum nanoparticles is prepared by reducing $PtCl_2$ ($10^{-5}$M) with ethylene glycol at 160° C. The ethylene glycol acts as a reducing agent for $PtCl_2$ and a solvent for the formation of Pt nucleii. A second solution is prepared where $AgNO_3$ ($4.33 \cdot 10^{-2}$M) is dissolved in 2.4 wt % poly(vinyl) pyrrolidone PVP, Mw~40,000, in ethylene glycol. The Ag solution is slowly added to the Pt seed solution which is under reflux at 160° C. The solution is stirred for 60 minutes and cooled to room temperature diluted with acetone 10 times by volume and the nanowires separated by centrifugation. Silver wires of about 40 nm in diameter with lengths up to 15 μm are obtained. The silver nanowires are re-dispersed in 2.4 wt % poly(vinyl) pyrrolidone PVP, Mw~40,000, in ethylene glycol and heated to 160° C. A second solution is prepared where $AuCl_3$ is dissolved in ethylene glycol and heated to 160° C. to form nanoparticles of gold in solution. This solution cooled to room temperature is added to the refluxing silver nanowires and stirred at temperature resulting in silver nanowires coated with gold. The nanowires can be separated from the cooled solution by centrifugation.

Example 8

A gold coated silver nanowire can be prepared by a different method where the nanosilver wires are not isolated. First a solution of platinum nanoparticles is prepared by reducing $PtCl_2$ ($10^{-5}$M) with ethylene glycol at 160° C. The ethylene glycol acts as a reducing agent for $PtCl_2$ and a solvent for the formation and the suspension of the Pt nucleii. A second solution is prepared where $AgNO_3$ ($4.33 \cdot 10^{-2}$M) is dissolved in 2.4 wt % poly(vinyl) pyrrolidone PVP, Mw~40,000, in ethylene glycol. The Ag solution is slowly added to the Pt seed solution which is under reflux at 160° C. The solution is stirred for 60 minutes. Then a third solution of $AuCl_3$ dissolved in ethylene glycol and heated to 160° C. for ten minutes and cooled to room temperature is added to the refluxing silver wire dispersion. The mixture under heating is stirred to produce gold coated silver nanowires. The preferred heating range is from 140 to 170° C. and held at temperature from 30 to 120 minutes. Upon cooling these wires are isolated under centrifugation.

In the above examples, PVP is used in all procedures. It is not necessary to limit to this polymer. Other polymers such as polyacrylamide and polyethylene imine (PEI) may also be used. When the polymer is changed, it can also cause a change in the shape of the nanoparticle that is produced, e.g., use of polyacrylamide can cause a two dimensional growth leading to the formation of nanoplates. It is not necessary that the metal concentration in the solutions will match the alloy composition, and this factor can be determined by experimentation. PEI may be used in a novel way, particularly for forming the alloys. This polymer is known to bind metal cations. For example this has been used successfully as demonstrated in published US patent application 2008/0050528. This patent application is included herein by reference. Thus, the various alloying element salts can be added and bound to the polymer, or alternatively, different solutions may be made of PEI comprising each of the bound metal salts and then mixed. In this case one ensures that the metal bound polymer solution has the correct amount of alloying metals. In this process during the solution making step, the unbound metal ions are generally removed by filtration process. Use of this process can lead to alloys where the elemental composition of the solution may be similar to the alloy composition. One may also use a mixture of polymers to tailor the properties of the particles as long as they are compatible, e.g. metal bound PEI with PVP. The molecular weight of the polymer may also be varied to control the kinetic processes and miscibility. Additional salts (e.g., sodium chloride, potassium chloride, etc.) may also be added to control the reaction kinetics.

Coating of Substrates and Particles

For many applications it is preferred that the metal coatings are deposited on other substrates. As described in the next section such coated substrates may impart properties and/or economics that are difficult to achieve otherwise.

The methods described above to form nanoparticles may also be used to deposit coatings on substrates. The mechanism of formation of the nuclei is via nucleation of small particles formed by metal reduction in the solution (also called homogenous nucleation) and then growth. Depending on the composition of the solution (salts used, polymer type, molecular weight, additives and concentrations) and the conditions (temperature, pressure, etc), these nuclei grow along certain crystallographic planes resulting in shaped nanoparticles. One can also use substrates that are immersed in these solutions, and imperfections on the surface of the substrates can lead to formation of nuclei (heterogeneous nucleation) that grow. By processes similar to those described for homogenous nucleation. A very high density of heterogeneous nucleation will result in forming continuous coatings as these nuclei grow and merge into each other. Depending on the solution composition and conditions these nuclei may also grow in a direction perpendicular to the substrate resulting in conductive hair like features.

Of particular interest are formation of coatings on micro-sized or nanosized particles that are disc or fiber shaped. This means that one of the dimensions (e.g., fiber diameter or the disc thickness) is in the micrometer or nanometer region. The range of this dimension will usually range from about 10 nm to about 10 microns. These particles should have at least one of melting point or their glass transition temperature above the processing temperature of the coating processing temperature. Usually, these particles are non-conductive, thus these can be organic or inorganic (e.g. inorganic oxide glass) materials. Some of the preferred organic fibers are microfibers made out of polyurethane, polyolefins, polyester, nylon, acrylic, rayon, and may also be natural (e.g., silk and cotton) or composites fibers of these. The cross-section of the microfibers may be round or any other shape, e.g., star or triangular shaped. For the fiber the entire range from nano to micro range will be called as "microfibers" in this invention. The microfibers have preferably a denier value of less than 1, and more preferably less than 0.3 and the most preferred denier is less than 0.1. These fibers are generally made by electrospinning (e.g., U.S. Pat. No. 6,106,913), or these could be made as composites in fibrous shape of two or more polymers (e.g., polymer A and polymer B) by melt, solution or electrospinning. After formation, the cross-section looks like a large diameter of polymer A with embedded strands of polymer B. Polymer A can then be dissolved in a solvent (e.g., water) leaving ultrafine strands of polymer B. This process of making fibers is described in U.S. Pat. No. 5,366,804 where polyester and polyamide composite fibers are made and wherein polyamide is removed leaving behind polyester microfibers. Continuous strands of these fibers may be coated by passing them through the coating solution, or these may be chopped and then added to the coating solutions. Their lengths may be varied, but preferably at least 5 to 10 times more than their average diameter, and more preferably about 100 times more than their diameter.

A significant use of these coated particles is in inks and coatings that can be deposited by solution techniques, particularly by any of the printing techniques to yield electronic connectors and also transparent conductors. As the appetite for printed electronics increases, more of such innovative products will be required to fabricate electrooptic devices including displays, antennas, connectors, chips and other components. These can also replace many conventional busbars in other applications such as shielding (against electromagnetic or radio frequency radiation), static prevention, busbars for displays or other electrooptic devices such as electrochromic eyewear, automotive mirrors, electrochromic windows, liquid crystal windows, etc. For printed electronics many of the applications are on flexible substrates such as paper, fabrics, polymeric sheets, etc. Further, if several printed layers are used to lay on top of each other to form a component or a device, one has to ensure that the process of deposition are compatible and also that all of these are flexible and preferably have similar thermal expansion characteristics so that these do not fail in the field. Use of organic microfibers that are coated with thin metals provides both flexibility and expansion coefficient more closely matched with other polymers. As an example for transparent conductors, the individual metal coated conductive microfibers may be invisible to the eye. Usually any article that makes a subtended angle of about 0.01 degrees or less is not discernable. As an example, if a line width of 100 microns is observed from a distance of about 50 cm, it subtends an angle of about 0.01 degrees, and this would be just on the borderline of being observable. A line width of 10 microns (or a fiber of width of 10 microns) from this distance will not be observable. For a transparent conductor we will have to control the density of such fibers so that these form a connected network with spaces between them. This could be a network (a mesh) of randomly oriented fibers (akin to a non-woven fabric). Further, this network of microfibers may be augmented by adding conductive nanopartricles such as those of metals, carbon or those coated with these. One advantage of using the coated microfibers is their ability to provide mechanical reinforcement to the layer. One may use fibrous metal \nanoparticles as described above or available from Cambrios or conductive carbon nanofibers (also called nanorods or nanowires). The preferred carbon nanowire that may be used are single wall, double or multi-wall nanowires. Typically these carbon fibers are from about 1 to 25 nm in diameter, and may be 100 nm to a few microns in length. There are many suppliers of these materials e.g., NanoLab (Newton, Mass.), Nano-Carblab (Moscow, Russia), Nanocs (New York, N.Y.), Nanocyl (Rockland, Mass.)). These are added to the solutions by simply dispersing them in the coating solutions. Disc like conductive carbon particles such as graphene may also be used. Further, sometimes one may use nanoparticles or fibers that are functionalized on the surfaces to provide more compatibility with the matrix. Some of the common functional groups are amine and carboxylic acid groups.

Figure 1:
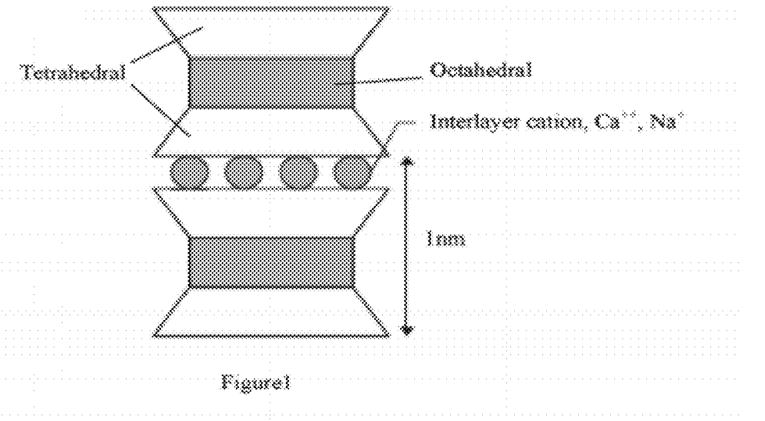
FIG. 1: Shows the structure of a layered silicate schematically.
Figure 2:
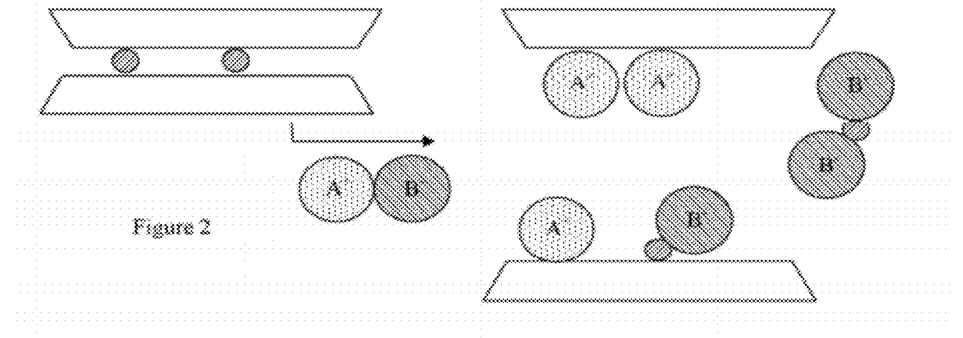
FIG. 2: Shows the schematics of exfoliation process of a layered silicate in a salt solution.

Another preferred substrate/particles that can be coated with metals are layered silicates or clays. These clays are exfoliated, or sheared to give disks of nano-thickness (nano-disks) which can be economically coated to yield conductive nanodiscs. The description below provides more information of processing of such particles. These layered silicates are clays (natural and synthetic) which have sheets of silica tetrahedrals and sheets of magnesium or aluminum oxide octahedrals that are arranged together as shown in FIG. 1. This figure shows that an octahedral sheet is sandwiched between the two tetrahedral silica sheets. Since these sheets are not perfect, i.e., there is occasional oxygen that is replaced by hydroxyl or an aluminum replaced by a silica or magnesium or vice versa, creating some charge imbalance. This charge is compensated by interlayer cations such as sodium, potassium and calcium ions. As shown in FIG. 2, these silicates may be cleaved or exfoliated in discs with thicknesses of about 1 nm or more along these interlayers. Several clays are available in a variety of compositions and layer arrangements. It is the surfaces of these clays that we are proposing to coat in this innovation.

As an example, kaolin clay particles are 1 μm in diameter and have a thickness of 0.1 μm with tightly alternating tetrahedral and octahedral sheets which are difficult to take apart as thinner sheets. Montmorillonite clays with sodium have very small grain size and as shown (FIG. 1) have unit cell thickness of 1 nm, and these can be taken apart along these planes. As another example, montmorillonites based on calcium forms interlayers that may be taken apart as 20-30 nm thick plates. Illite, another related mineral has sheets can be broken down in thickness of 10 nm and related mica sheets may be almost 1 mm in thickness in the separated state. Several different types of layered silicates are available from Southern Clay Products (Gonzales, Tex.), including montmorillonite, bentonite (e.g., Tixogels®) Laponite® and Cliosite®, where the Laponites are synthetic clays, and in Cliosite the native interlayer cations are replaced by large organic ions.

For coating, silicate sheets with metals in a thickness of about 2-5 nm, it is preferred to choose a clay thickness of greater than 10 nm or larger. To keep the advantages of nanosize, a preferred clay particle thickness is in the range of about 10 to 50 nm. For coating nanosized sheets a preferred montmorillonite is the one with calcium based on thickness considerations. Before implementing the chemistry of coating processes, the clays have to be exfoliated or cleaved along the interlayers to form the nanodiscs. Typically, these clays are available as powders and microscopically these may be several microns to hundreds of microns in size. For exfoliation, these are put in solutions and sheared at a high rate so that these separate out as plates by mechanically failing at the interlayer with cation interfaces. This exfoliated state must be maintained in the coating solution as well.

For coating, the SSP process is modified to nucleate the crystal growth from the surfaces of the substrates (heterogeneous nucleation) and avoid or reduce nucleation of the particles in the solution (homogenous nucleation). The growth characteristics of the nucleated crystals will determine if the crystals will grow along the surface to yield a coat or grow perpendicular to the substrates resulting in substrates with conductive hair sticking out from various places on the substrate.

To exfoliate the clays, a preferred route is in a salt solution as discussed below. Further, the preferred salt used for this purpose should have the same metal cation that will be coated as metal. Preferred metal cations are of the noble and the rare earth metals listed earlier. For alloys comprising several metals, the cation(s) in the exfoliation solution may comprise more than one cation from any of these. A schematic diagram showing exfoliation is shown in FIG. 2, where some of the interlayer cations are substituted by the cations present in these solutions. The solutions may be aqueous or non-aqueous. Polar solvents that can dissociate the salts may be used (e.g., esters, carbonates (e.g., propylene carbonate), alcohols, carbonate and ionic liquids). More examples of such solvents are provided in U.S. Pat. No. 5,140,455 which is included herein by reference. Since, the state of exfoliation should be maintained during coatings deposition. One method will be to wash (in order to remove any unwanted salt and native cations) and recover the exfoliated particles without drying. As an example, ethylene glycol is added before the recovered particles are dried, and the trace solvents from the previous step may be removed under reduced pressure and/or elevated temperature (e.g., in a rotoevap). Alternatively, ethylene glycol may be used for exfoliation medium as long as the salts can be solubilzed in this. The principle of exfoliation and replacement of cations is schematically shown in FIG. 2. Consider a silicate clay where two silica tetragonal sheets are held together by dications such as calcium. When this is immersed in salt solutions (such as $AgNO_3$ shown by $A^+B^-$) and sheared at a high rate, the salt cations will be substituted as shown in this figure. These nanodiscs are removed, rinsed and then subjected to a reduction process in ethylene glycol to deposit silver on the surface. It may be possible that for the growth of silver, platinum nuclei are more effective.

The metal cations attached to the exfoliated surfaces act as imperfections to promote heterogeneous nucleation when these surfaces are subjected to appropriate solutions. Ethylene glycol solutions with additives such as those described above (e.g., silver nitrate-for silver deposition, polymer, catalysts, other salts, etc.) may be used. Solutions that promote plate like morphology or a linear morphology may be used. This mode of growth is influenced by ingredient types, their concentration and processing temperature profile.

Typically both nucleation and growth have strong temperature dependence, where nucleation is preferred at lower temperatures and growth at higher temperatures. Thus these solutions may be subjected to complex time temperature profiles that will include both low temperatures to encourage nucleation, and higher temperature for growth. Typical temperature range will be in the range of about 130 to 190 C. As the growing crystals touch each other, it will result in coatings being formed.

Application of Nanoparticle Comprising Electrodes to Form EC Devices

EC devices are used in automotive mirrors, energy efficient windows, eyewear, displays to name a few. Particularly relevant method and materials to form EC products are provided in U.S. patent application Ser. No. 12/468,719 (filed May 19, 2009), entitled "Composite electrode and electrolytes comprising nanoparticles and resulting devices" and U.S. provisional patent application 61/168,421 filed on Apr. 10, 2009, entitled "Novel electrochromic materials, devices and applications of the same"; and methods to form flexible EC devices including windows is in published US patent application U.S. 2008/0310007 entitled "Laminated electrochromic devices and processes for forming the same". All of these applications are included herein by reference. The displays described here can be formed using conductive electrodes and composites which have been disclosed in the present invention.

One advantage of using nanoparticles is a sharp decrease in their melting point which allows these to be sintered at very low temperatures to form highly conductive paths even on plastics substrates. The melting point of nanoparticles decreases rapidly below 50 nm due to increased surface area. Thus those formulations with nanoparticles may be heat treated to improve the conductivity. As an example, inks with nanoparticles of silver and gold are formulated with particle sizes below 10 nm so that after printing these can be melted at low temperatures to produce conductive lines and coatings with a high metal content. Several commercial inks with metal nanoparticles have their melting point is below 200 C and these may be laser sintered by just heating the conductive lines and coatings rapidly without effecting the substrate (e.g., such inks are available from UT Dots inc (Champaign, Ill.)). However, it is not necessary that the conductive coatings have to be sintered, if these percolate and the presence of matrix or binders can be tolerated.

Figure 3:
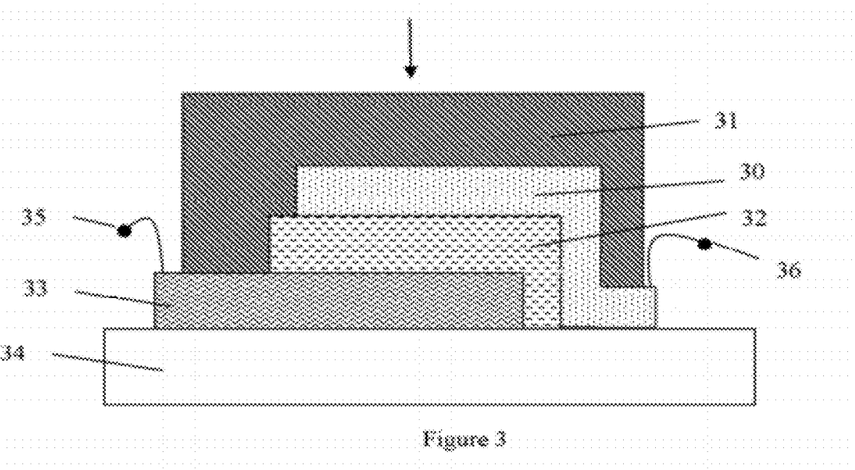
FIG. 3: Shows an EC device fabricated by the inventive method.

FIG. 3 shows a schematic of an EC display device that is formed on paper or fabric using the transparent conductive electrodes formed with the corrosion resistant formulations described herein. This shows a single pixel of the display that is formed by an EC layer 32. The substrate (paper, fabric or a metal coated polymer or a metal coated polymer film) is 34, the first conductive electrode 33, and the second conductive electrode 30, and an encapsulation layer 31 (one may also use conductive metal foil that acts both as a substrate and as a conductor. At least one of the two electrodes, i.e., 33 or 30 is patterned. The two powering terminals are shown as 35 and 36. The display is viewed from the side of the arrow. EC formulations and layers using hydrophobic materials are preferred (although hydrophilic materials may also be used) as ensure that device characteristics are less sensitive to changes in atmospheric humidity and also reducing the corrosion of metal containing conductors if used.

Although this display may be processed by any method, the description here is particularly aimed to where all of the layers are deposited by a printing technology. In addition, since different layers have different compositions, and may have different thickness requirements, it is likely that these are formulated differently, where more than one printing technique is used. Before coating the substrate with 33, it may be optionally coated with a barrier layer to prevent ingress of moisture and air (particularly oxygen) or any of the chemicals from the paper or fabric to permeate into the device. The barrier layer may be any of the polymers that may be chosen from the list of the matrix materials provided earlier. It is generally preferred that a hydrophobic material be used or multiple layers are used to provide barrier against other materials. For example polyvinylalcohol is one of the better oxygen barrier resins which is hydrophilic, thus it is laminated on both sides by hydrophobic materials which results in laminates that are both water and oxygen resistant. The thickness of the device in FIG. 3 may be several microns to hundreds of microns and deposited by a printing or a coating process. Layer 33 may be a conductive paste or an ink that may be patterned (e.g., printed) in a fashion to form electrodes (pixels) and the connectors. The thickness of this layer may be from about a micron to several 10 s microns. This may be a carbon comprising paste or an ink or this may be formed using the nanoparticles or coated nano or other particles as described earlier. If the substrate is an opaque substrate, e.g., paper or fabric, where the device is viewed from the other side, then this layer may not be transparent.

The electrochromic layer may comprise of one or several layers. Single layer devices comprise of a polymer matrix with redox materials. Hydrophobic matrices with ion conductive properties are preferred, e.g., copolymers of fluorinated materials used in the lithium battery industry (e.g., Solef® and Kynar® materials listed earlier) (see U.S. Pat. No. 7,300, 166, which is incorporated herein by reference). EC dyes are listed in several publications (see U.S. Pat. Nos. 6,961,168; 7,064,212 and 7,300,166) which may be separate anodic and cathodic dyes such as viologen salts, ferrocene, phenazine, phenothiazine, anthracene, or those dyes where a cathodic and anodic moiety is bridged in a single molecule such as viologen salt and ferrocene, viologen salt and phenazine. Plasticizers are added, which are usually high dielectric liquids that are able to solubilize the dyes such as propylene carbonate, polypropylene glycol, polyethylene glycol, esters, phosphates and ionic liquids. Several of the preferred plasticizers are those that would not migrate to the substrates or other layers, thus the preferred ones are ionic liquids, particularly the ones that are hydrophobic. The ionic liquids may have anions such as $ClO_4^-$, $BF_4^-$, $CF_3SO_3^-$, $N(CF_3SO_2)_2^-$ (NTF or imide), $(CF_3CF_2SO_2)_2N^-$, $(CF_3SO_2)_3C^-$, $AsF_6^-$, $PF_6^-$, $Cl^-$, $Br^-$, tris pentafluoroethyl-trifluoro phosphate (FAP or $PF_3(C_2H_5)_3$). alkyl sulfate (e.g. $C_2H_5SO_4^-$) and tetracyanoborate, The preferred anions are those that result in hydrophobic ionic liquids, which from the above list are NTF, $(CF_3CF_2SO_2)_2N^-$, $(CF_3SO_2)_3C^-$, FAP, alkyl sulfate and tetracyanoborate. The preferred cations are chosen from one of the following: pyridinium, pyridazinium, pyrrolidinium, pyrimidinium, pyrazinium, imidazolium, pyrazolium, thiazolium, oxazolium, triazolium and tetraalkylammonium. More details are found in the several patents and applications that are already included herein by reference. One preferred ionic liquid is NTF salt of 1-butyl-3-methyl-pyrrolidium and a preferred dye is also an NTF salt of 4-4' bipyridiniuml,(4 (ferroceneyl butyl), which has both the anodic and the cathodic species linked together. It is preferred that if an EC dye is used, its anion be similar to the anion of the ionic liquid. Other ingredients can be disc shaped nanoparticles of silicates to decrease the back reaction, UV stabilizers and other additives (viscosity modifiers, such as fumed silica and surfactants, and salts (e.g. lithium and sodium salts with preferably the same anion as the ionic liquid if used) and acids). Opacifying additives with high refractive index (i.e., particles with refractive index greater than about 1.8 e.g., silica coated titania, titania, barium sulfate, zirconia) may be added so that when the display is viewed, the bottom electrode 33 is not visible, and further when powered, a high contrast is obtained. Thickness of this layer may be from about 0.5 to 20 microns. The above particles provide a white color appearance due to the scattering of light between the particles and the media that they are dispersed in. However, one can also use inert pigments and dyes that may be added to with or without the white pigments described above to change the electrolyte/background color. When this is done we have to ensure that when the electrochromic display is activated the contrast is still there, and that this dye/pigment is inert, i.e., it does not adversely affect the EC phenomenon and is preferably UV stable and stable at the redox potentials used to activate the EC display. For example, for most viologens that color to blue, blue-green, addition of yellow or red pigments (e.g., red iron oxide or a red organic dye) will still keep a high contrast. For molybdenum doped tungsten oxide EC material which colors to a neutral color, any color may be added to the background to blend it with the desired product aesthetics or design. Thus any complimentary color of the background to the coloration color of the EC material would be acceptable. This allows one to fabricate printed displays in a variety of background colors by adding inert dyes and pigments. These pigments may also be used in formulations to hide electrodes as discussed for the other devices below.

Layer 30 is a transparent conductor that is preferably formed by printing and comprises of conductive nanoparticles, as available from Cambrios or as discussed here formed by corrosion resistant formulations. This layer may also be formed by microsized particles, particularly comprising of metal coated fibers, and may also have conductive nanoparticles added as an option. As discussed earlier, this may have a matrix material, or may just be a non-woven transparent mesh. After deposition (coating or printing process) this layer may be pressed into the EC layer 32 to form a good contact. The thickness of this layer may be about 0.2 to 20 microns.

Encapsulation layer 31 is a polymeric material that protects the EC material and other components from water and air, and is transparent. It may be again chosen from several of the matrix materials listed earlier. This layer may be a single layer or several layers with different materials. For example this may be a three layered material with polyvinyl alcohol (a good oxygen barrier) in between two hydrophobic materials. This layer may also be printed, or even be formed separately and then laminated to the substrate. The contacts for the terminals for the display may be exposed so as to connect to other circuitry.

An advantage of depositing all layers by printing is to integrate the display making process with other electronic elements that may also be printed, e.g., connectors, RF antennas, or even IC chips. This can result in low cost products such as tags or displays for a variety of applications in packaging industry for inventory control, product authentication, anti-theft, product status, etc. as discussed in several published applications, e.g., US Patent applications 20070114621A; 20080100455; 20040022542A1 and Published PCT patent application WO08022972A1.

To promote adhesion and good wetting additional layers or additives (e.g., silanes and surfactants respectively) may also be used. These layers can comprise of these ingredients or additional adhesion promotion layers may be required. Further, polymers used in layers 33, 35, 30 and 31 can all belong to the same family to promote good compatibility. However, it is important that if plasticizers are used in layer 32, then these should preferably not migrate to the other layers as it may cause the device characteristics to change with time.

Figure 4:
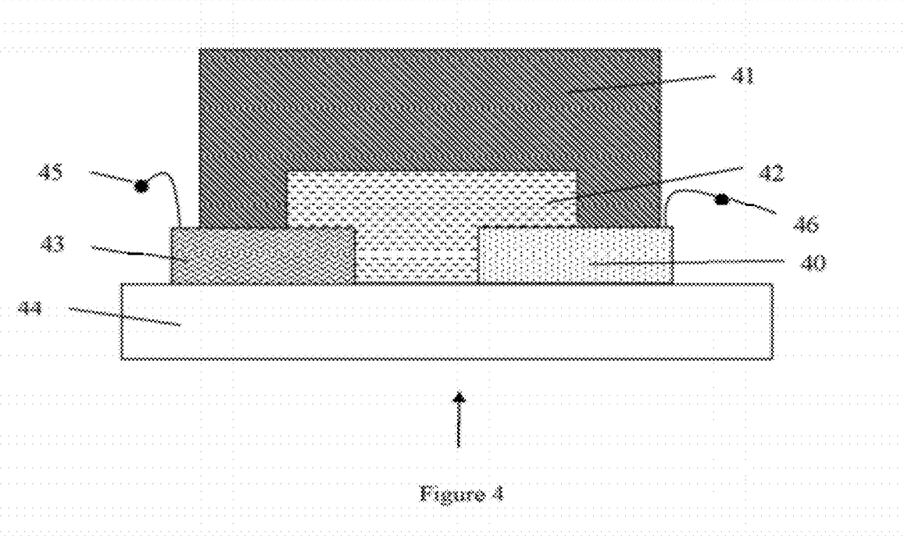
FIG. 4: Shows an EC device fabricated by the inventive method.

FIG. 4 shows another example of an EC device that is formed on a transparent sheet 44 (e.g., a polymeric film). The two opposing electrodes 43 and 40 are deposited by a printing process and are formed using the TC materials described above. Instead of printing, one may start out with a transparent conductor (such as indium tin oxide (ITO) or thin layer of gold) coated on a plastic sheet from many suppliers, which can be patterned by standard etch techniques. ITO, silver and gold metal coated transparent substrates are available and one of them is CP films (Martinsville, Va.) in a conductivity range of about 4.5 ohms/square to about 300 ohms/square. As compared to FIG. 3, the two opposing electrodes are in a side by side (interdigited) relationship, rather than stacked on top of each other. These figures are only to show the principles of layer configuration, as any of the devices described in this invention may be made in either configuration, or on opaque or transparent substrates. The electrolyte 42 comprises of the matrix polymer, dye and a plasticizer along with the other ingredients described above. The device is encapsulated by layer 41 and powered via terminals 45 and 46 (in all the figures these terminals are shown to be coming out of the substrate, but these may also be connected to a power source on the substrate, such as a battery, antenna, a chip, etc). The display is viewed from the side of the arrow. As an example when a viologen salt and a ferrocene comprising dye redox couple is used and the terminal 46 is negative, the region in the electrolyte 42 that is touching or close to the electrode 42 turns deep blue, whereas the electrolyte area touching or close to the opposing electrode 43 will color only a little due to shallow color of ferrocenium. The colored area in the vicinity of the electrode 40 will stand out providing high contrast. Alternatively (not shown in the figure) one could have deposited a patterned inert and opaque layer (preferably similar in color to layer 42 which may also be opaque) before depositing electrode 43, so that any coloration in this area would not be visible. In fact the opaque layer should also cover any gaps between the pixels, so that only the desired pixelated areas are viewed. In this case the electrode 43 need not be transparent (this could be a black colored paste made out of conductive carbon particles (including carbon nanotubes) and a binder). Another way to make the display, is by lamination process (e.g., see U.S. patent application Ser. No. 12/140,054 for lamination procedures), where two substrates coated with conducting materials (one of which is transparent) are used. Typically on at least one of these the conductive path is patterned. The EC material is deposited on one of them uniformly or in a pattern and then the two substrates are laminated where EC material is sandwiched between two conducting surfaces. When the device is powered, the EC material changes color to display information, depending on the electrode pattern. The EC layer may be deposited by a printing process. In this application one of the substrates may also be a conductive metal foil.

Figure 5:
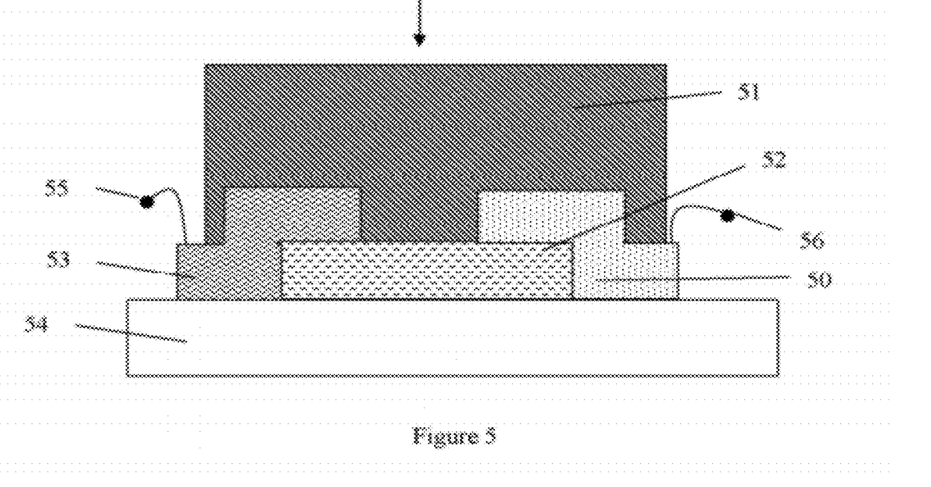
FIG. 5: Shows an EC device fabricated by the inventive method.

FIG. 5 shows yet another variation where an opaque substrate 54 is used. The EC properties are in electrolyte 52 are as described in FIG. 4. The two opposing electrodes are formed as 52 and 53. Layer 51 is an encapsulation layer, and the arrow shows the direction of viewing. Essentially the electrolyte layer is deposited first and then the electrodes are deposited (which was the opposite for FIG. 4). If terminal 56 is powered negative compared to terminal 55, the electrolyte region close to the electrode 50 colors deep and is visible. Again as earlier, the electrode 53 can be masked and need not be transparent.

Figure 6:
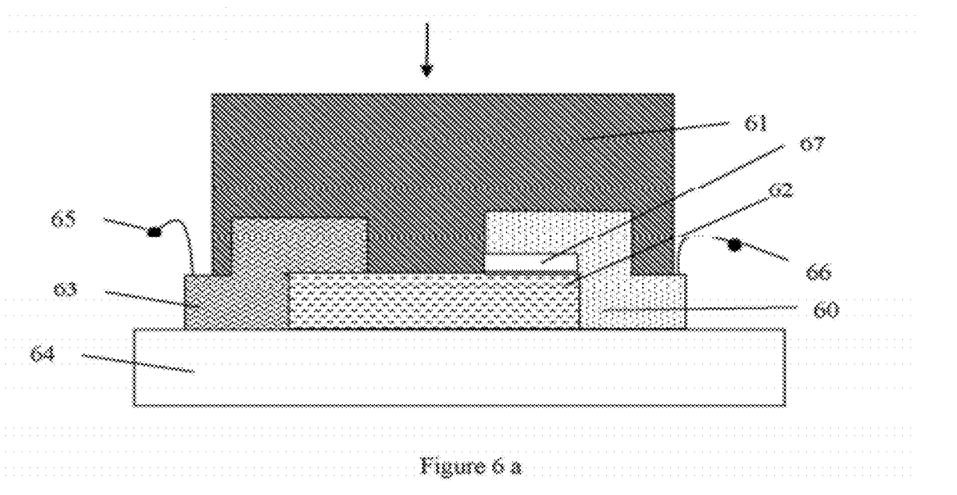
FIG. 6a Shows an EC device fabricated by the inventive method.
FIG. 6b Shows an EC device fabricated by the inventive method.

FIG. 6a shows another type of reversible device in which EC layers are separate from the electrolyte. EC layer is shown as 67 that is placed between the transparent conductor 60 and the electrolyte is 62. The encapsulation layer is 61 and the device is powered from terminals 65 and 66. The substrate 64 is opaque and this viewed from the side as shown by the arrow. If the EC layer is a cathodic type comprising of viologen, tungsten oxide, PEDOT, etc., then an anodic material such as ferrocene is added to the electrolyte. The anodic material may also be substituted with a bridged compound comprising an anodic and cathodic moiety. Again the electrode 63 may be masked and need not be transparent. When the device is powered with electrode 66 being negative, the EC layer colors. The EC layer may be formed in several ways as described in the provisional application by Agrawal, et al. A particularly novel way that is described in that application is to make a printable formulation of EC materials that combines an EC material in a matrix with electronically conductive nanoparticles. EC materials such as inorganic oxides (e.g., tungsten oxide) may be coated on particles that are conductive or non conductive, and then incorporated in the EC layer formulation. Another way is to make these as nanoparticles (these oxides should have at least one dimension smaller than 500 nm, preferably less than 100 nm) and then incorporate them in the formulation. The matrix composition, other than the presence of electronically conductive particles and the EC dye may be similar to the electrolyte.

To increase the memory, that is to retain the color of the pixel when the power is removed, one may also make use of selective ion conduction layers (SITL) which may be inserted between the EC layer and the electrolyte (shown in FIG. 6b as layer 69). These are described in U.S. Pat. No. 6,178,034. A SITL layer allows one type of ions to go through and not the others, which may be based on the size of the ions or the type (e.g., cation vs anion). SITL layers formed by metal salts of acidic polymers (e.g., lithium or sodium salt of polystyrenesulfonic acid) allow lithium, sodium and potassium ions to pass thorough more readily while block larger anions. These layers are usually put down as thin coatings preferably less than 2 microns thick. More details are in the above patent application which is incorporated herein by reference. Thus, use of SITL layers in display devices, particularly in printed display devices is novel. As a specific example, an EC layer with tungsten oxide, SITL layer as sodium salt of polystyrenesulfonic acid and ferrocene and a lithium salt in the electrolyte, upon reduction will allow the lithium ions to go through this layer and color tungsten oxide. Similarly, polymers with a cation attached to the main chain and a mobile anion (e.g., poly(vinylbenzyltrimethylammonium with a perchlorate or an NTF ion) may be used as SITL layers to conduct anions. SITL may be organic or inorganic. The ferrocenium ions are not able to go through and thus the memory is maintained for a long time. Ferrocene derivatives with larger groups (e.g., butyl ferrocene) may be used to reduce the leakage of ions further and imparting better memory while all the other parameters are the same. Using SITL layers can change the memory of a device from several seconds to several days and longer.

Figure 7:
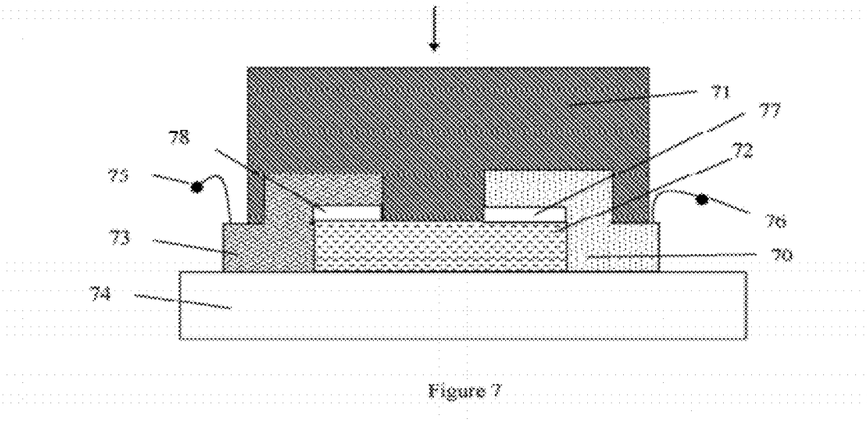
FIG. 7 Shows an EC device fabricated by the inventive method.

FIG. 7 shows yet another type of an EC device where separate anodic (78) and cathodic (77) layers are used and are separated by the electrolyte. These layers are respectively inserted between the electrolyte 72 and the electrodes 70 and 73 respectively. The encapsulation layer is 71 and the device is powered by the two terminals 75 and 76. The substrate 74 is opaque. U.S. patent application Ser. No. 12/140,054, and the U.S. Pat. Nos. 6,906,842; 6,373,618; 6,266,177 and 6,327,069 which are all included herein by reference provides information on several materials that may be used as electrodes and counterelectrodes in EC devices. The inorganic oxides may be made in printable format by coating them on particles and then incorporating these particles in a matrix as discussed earlier. As an example, EC electrode may comprise of tungsten oxide or viologen salt and the counterelectrode may be of a lower coloring efficiency material such as ferrocene, cerium titanium oxide, or may even have a high coloring efficiency such as PEDOT and polyaniline, phenazine or phenothiazine. The counterelectrode may be masked from the view as discussed earlier.

Figure 8:
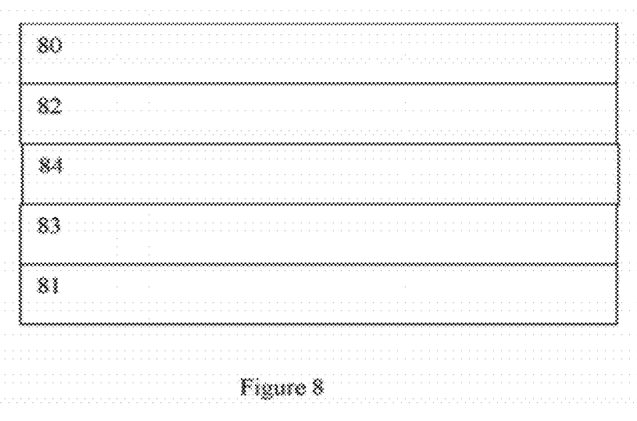
FIG. 8 Shows an EC window device fabricated by the inventive method.

FIG. 8 shows the construction of a laminate window that can be made using the transparent conductor of this invention. These are typically used for architectural glazing and glazing for various modes transportation to dynamically attenuate the solar energy (at least one of solar UV, visible and infrared) that is transmitted through them. FIG. 8 shows two substrates 80 and 81 that are respectively coated with transparent conductors 82 and 83. These are laminated to a polymeric layer 84. The layer 84 can be both an ion conductor and have EC redox dyes, or may comprise of several layers further constituting ion conducting layer and redox layers as described in US patent application 2008/0310007. An advantage of the transparent conductors of the present invention is their high conductivity and being able to coat from solutions which enables one to produce large windows using cost-effective manufacturing methods using flexible substrates, such as roll to roll processing. These windows can be used to retrofit conventional windows with EC feature by bonding these flexible devices. The high conductivity transparent conductors can also be used to make windows on rigid substrates or using vacuum deposited coatings or by any other method. A general description of EC windows is provided in U.S. Pat. Nos. 6,639,708; 6,795,226; 6,995,891 and in a journal publication (Granquist, C. G., Lansaker, P. C., Mlyuka, N. R., Niklasseon, G. A., Avendano, E., *Progress in chromogenics: New results for electrochromic and thermocromic materials and devices*, To be published in 2009 in Solar Energy Materials and Solar Cells, doi:10.1016/j.solmat.2009.02.026). All of these are included herein for materials used, construction and application details.

It is evident based on the product requirements and the substrate characteristics, one can form numerous variations on these EC devices for displays, and further, the transparent conductors and corrosion resistant particles of this invention may be used for devices and applications other than electrochromic applications.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

The invention claimed is:

1. Conductive busbars and connectors, for use in flexible electronic devices, electrochromic devices, displays, light emitting and light control devices, wherein said conductive busbars and connectors are deposited from liquid suspensions comprising conductive nanoparticles, wherein the said conductive nanoparticles are formed of conductive and corrosion resistant metal alloys, wherein the said alloy is selected from at least one of
  (a) a silver comprising alloy in which the alloying element is at least one of Be, Cu, Ge, Ni, Ru, Rh, Au, Pt, Pd, La, Ce, Nd, Sm and Eu, and
  (b) a copper comprising alloy in which the alloying element s at least one of Ag, Be, Ge, Ni, Ru, Rh, Au, Pt, Pd, La, Ce, Nd, Sm and Eu.

2. Conductive busbars and connectors as in claim 1, wherein the nanoparticles are nanofibers.

3. Conductive busbars and connectors as in claim 1, wherein the nanoparticles are corrosion resistant alloys which comprise at least one of copper and silver.

4. Transparent conductive layer with a surface resistivity of at last 100 ohms/square, wherein the said conductive layer comprising of conductive nanoparticles, wherein the said conductive nanoparticles are formed of conductive and corrosion resistant metal alloys, wherein the said alloy is selected from at least one of
  (a) a silver comprising alloy in which the alloying element is at least one of Be, Cu, Ge, Ni, Ru, Rh, Au, Pt, Pd, La, Ce, Nd, Sm and Eu, and
  (b) a copper comprising alloy in which the alloying element, is at least one of Ag, Be, Ge, Ni, Ru, Rh, Au, Pt, Pd, La, Ce, Nd, Sm and Eu.

5. A transparent conductive layer as in claim 4, wherein the nanoparticles are nanofibers.

6. A transparent conductive layer comprising conductive nanoparticles formed on a substrate, wherein the said conductive nanoparticles comprise of at least one of copper and silver, and are further coated with a conductive layer of different metallic composition that reduces the corrosion of the said conductive nanoparticles and the said different metallic composition comprises at least one of Ag, Be, Cu, Ge, Ni, Ru, Rh, Au, Pt, Pd, La, Ce, Nd, Sm and Eu.

7. A transparent conductive, layer as in claim 6, wherein the nanoparticles are nanofibers.

8. A transparent conductive layer as in claim 6, wherein the corrosion resistant material with a different composition is selected from at least one of (a) silver comprising alloy is selected in which the alloying element is at least one of Be, Cu, Ge, Ni, Ru, Rh, Au, Pt, Pd, La, Ce, Nd, Sm and Eu, and
  (b) a copper comprising alloy is selected in which the alloying element is at least one of Ag, Be, Ge, Ni, Ru, Rh, Au, Pt, Pd, La, Ce, Nd, Sm and Eu.

9. A solid transparent conductive layer comprising of conductive nanoparticles, wherein the said conductive nanoparticles comprise of carbon, and are further coated with a conductive corrosion resistant metallic layer comprising at least one of Ag, Be, Cu, Ge, Ni, Ru, Rh, Au, Pt, Pd, La, Ce, Nd, Sm and Eu.

10. A transparent conductive layer as in claim 9, wherein the conductive nanoparticles are graphite.

11. A transparent conductive layer as in claim 9, wherein the conductive nanoparticles are nanofibers.

* * * * *